(12) United States Patent
Lundmark

(10) Patent No.: US 7,934,733 B2
(45) Date of Patent: May 3, 2011

(54) STABILIZING DEVICE FOR A HEAVY VEHICLE

(75) Inventor: Andreas Lundmark, Göteborg (SE)

(73) Assignee: Volvo Lastvasgnar AB, Goteberg (SE)

( * ) Notice: Subject to any disclaimer, the term of this patent is extended or adjusted under 35 U.S.C. 154(b) by 0 days.

(21) Appl. No.: 12/513,172

(22) PCT Filed: Nov. 1, 2006

(86) PCT No.: PCT/SE2006/001238
§ 371 (c)(1),
(2), (4) Date: Dec. 8, 2009

(87) PCT Pub. No.: WO2008/054265
PCT Pub. Date: May 8, 2008

(65) Prior Publication Data
US 2010/0117323 A1    May 13, 2010

(51) Int. Cl.
*B60G 21/05* (2006.01)
(52) U.S. Cl. .................................. 280/124.106
(58) Field of Classification Search ........... 280/5.502, 280/5.507, 5.511, 5.514, 6.157, 124.106
See application file for complete search history.

(56) References Cited

U.S. PATENT DOCUMENTS

| | | | |
|---|---|---|---|
| 4,613,153 A * | 9/1986 | Shibahata et al. | 280/5.511 |
| 4,641,856 A * | 2/1987 | Reichenbach | 280/5.511 |
| 4,834,419 A | 5/1989 | Kozaki et al. | |
| 4,844,506 A * | 7/1989 | Moriguchi et al. | 280/5.51 |
| 4,892,329 A * | 1/1990 | Kozaki et al. | 280/5.511 |
| 5,178,406 A * | 1/1993 | Reynolds | 280/5.511 |
| 5,186,486 A * | 2/1993 | Hynds et al. | 280/124.107 |
| 5,362,094 A * | 11/1994 | Jensen | 280/124.107 |
| 5,954,353 A * | 9/1999 | Kincaid et al. | 280/124.152 |
| 6,354,607 B1 * | 3/2002 | Kawashima et al. | 280/5.511 |
| 6,659,475 B2 * | 12/2003 | Clements et al. | 280/5.508 |

FOREIGN PATENT DOCUMENTS

| | | | |
|---|---|---|---|
| DE | 1630278 A1 | | 5/1971 |
| DE | 2800549 A | * | 7/1979 |
| DE | 2800549 A1 | | 7/1979 |
| DE | 2849015 A1 | | 5/1980 |
| DE | 19510719 A1 | | 9/1996 |
| EP | 0430368 A1 | | 6/1991 |
| KR | 20040049943 A | | 6/2004 |
| WO | 9013450 A1 | | 11/1990 |

OTHER PUBLICATIONS

Supplementary European Search Report for corresponding European Application EP 06 81 2962.

* cited by examiner

*Primary Examiner* — Paul N Dickson
*Assistant Examiner* — Robert A Coker
(74) *Attorney, Agent, or Firm* — WRB-IP LLP

(57) ABSTRACT

A stabilizing device for a heavy vehicle, such as a truck or the like, includes a stabilizer bar which can be attached to a vehicle axle and pivotally mounted relative to a vehicle frame via stabilizer arms. The stabilizer bar and respective stabilizer arm are pivotally interconnected to each other. At least one said stabilizer arm is attached to a stabilizer anchor which is mountable in a vehicle frame, and the stabilizer anchor includes a stabilizer arm attachment point which is displaceable so as to enable the effective length of the stabilizer arm to be adjusted within a predetermined interval.

19 Claims, 4 Drawing Sheets

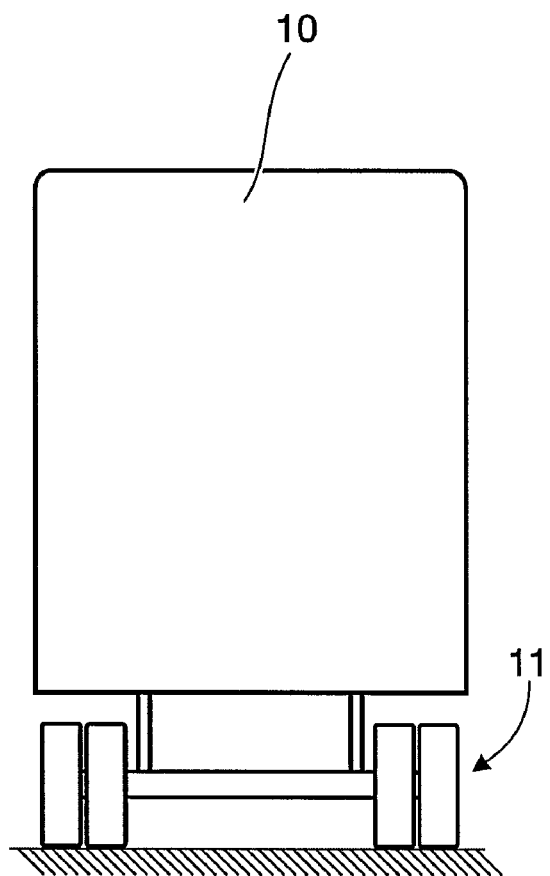 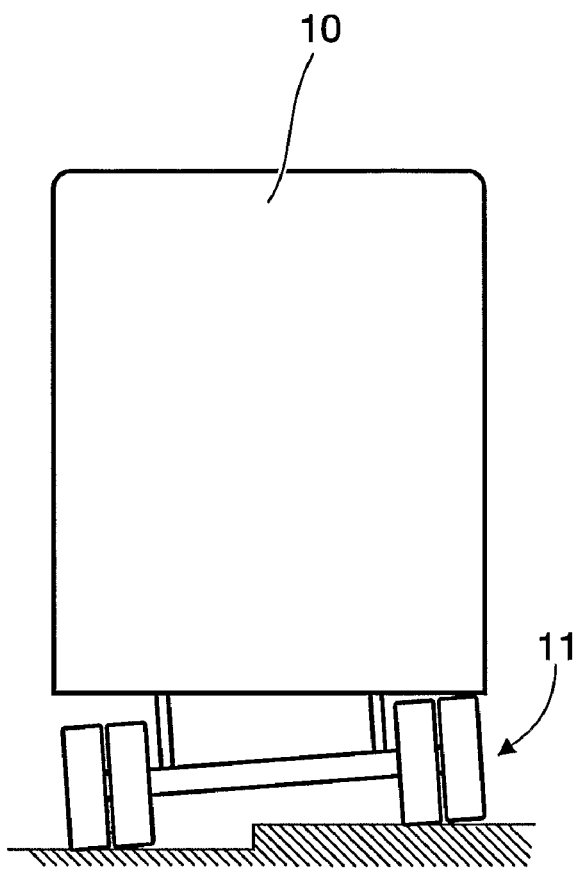
Fig.6a Fig.6b

STABILIZING DEVICE FOR A HEAVY VEHICLE

BACKGROUND AND SUMMARY

The present invention relates to a stabilizing device for a heavy vehicle, such as a truck or the like.

A stabilizing device of such kind is known from DE 28 49 015. According to this stabilizing device, two supporting stabilizer arms are constituted by adjustable hydraulic dampers. Hereby the reference level of the dampers may be adjusted and thereby providing an improved driving comfort as the suspension and the damping may be adjusted to the actual load of the vehicle.

Examples of other axle suspension devices including roll stabilizing devices are known from EP 0 430 368 and WO 90/13450.

The stabilizing device provides a roll stabilizing effect of the vehicle. As heavy vehicles such as trucks are more often air suspended the requirements of the anti-roll bar system are increased. Likewise as the trucks typically have the centre of gravity which is relatively high, this increased the demand for what the roll stabilizing system is capable of performing.

As trucks are being fitted with air suspension systems, it is also possible to provide a manual level control system with pre-programmed loading dock heights to facilitate the handling of goods to be loaded and unloaded from the vehicle. However, the roll stabilizing system actually counteracts this chassis lifting or lowering. Moreover, the range between the lowermost and the highest possible position of the chassis level are often dictated by the other components present, such as air bellows for the air suspension, etc. and the size of the components. This presents a limitation which means that the chassis level movement is not fully satisfactory with the users' demands by the present trucks.

As truck users demand the possibility of an increase in the level for lifting or lowering the chassis during loading and unloading, it is desirable to provide a stabilizing device of the initially mentioned kind which allows for an increase in the possible chassis lifting range.

By the provision of at least one said stabilizer arm which is attached to a stabilizer anchor means which in turn is mountable in a vehicle frame, wherein the stabilizer anchor means comprises a stabilizer arm attachment point which is displaceable so as to enable the effective length of the stabilizer arm to be adjusted within a predetermined interval, a stabilizer system may be provided which during driving actively is capable of changing the stabilizer forces and can facilitate a larger lifting range for the chassis level.

By the invention, it is realized that by providing a displaceable attachment point for the stabilizer arm, there is provided a possibility of effectively arranging a longer leveling stroke in the (telescopic) stabilizer arm resulting in an increase in achievable levels of the chassis height. Similarly, for smaller trucks, the chassis lifting may be provided as the stabilizing device according to the invention increases the rear approach angle as each of the arm components may be reduced in size. The stabilizing device according to the invention is applicable in relation to both front and rear axle stabilizer installation. Furthermore, the overhang can be reduced by allowing a tighter installation.

Another advantage of the invention is that stabilizer anchors means arranged on each side of the vehicle axle can be independently operated, which provides a possibility of keeping the truck horizontal in the sideways direction when loading and unloading. This is particularly advantageous in relation to delivery trucks in the city which during loading or unloading often must be parked with some of the wheels on the sidewalk, i.e. in a different ground level. By the invention it becomes possible to bring the vehicle chassis in a horizontal position when the vehicle is parked at an uneven or sloping surface for loading or unloading which in particular improves the loading or unloading of trolleys or other goods that are wheeled in or out of the truck.

In a preferred embodiment of the invention, the stabilizer anchor means comprises a pivot member with a stabilizer arm attachment point which is positioned off-set from the pivot centre of the pivot member. Hereby, the upper attachment point of the stabilizer arm can be moved up or down by pivoting the pivot member.

Preferably, the stabilizer device further comprises or cooperates with control means for controlling the pivoting of the pivot member and thereby controlling the chassis lifting motion and/or roll characteristics of the vehicle. Hereby, the position of the stabilizer arm and thereby effectively the length of the stroke may be adjusted. The control means may comprise an automatic adjustment function, e.g. during driving to prevent chassis rolls for instance when driving through curves. Furthermore, the control means may comprise manual adjustment means for leveling the chassis when the vehicle is parked. Accordingly, the control means can be connected to or constituted by an already existing vehicle chassis control system of a vehicle, and adapted to allow displacement of the stabilizer arm attachment point during driving of the vehicle. As an alternative or as a supplement, the control means are connected to or constituted by such a vehicle chassis control system and adapted to prevent displacement of the stabilizer arm attachment point during driving.

In a further preferred embodiment of the invention, the stabilizer arms on each side of the vehicle frame can be independently controlled by said control means in order to achieve a predetermined level and roll characteristics of the vehicle chassis.

Further advantages and advantageous features of the invention are disclosed in the following description.

BRIEF DESCRIPTION OF THE DRAWINGS

With reference to the appended drawings, below follows a more detailed description of embodiments of the invention cited as examples:

In the drawings:

FIG. 6a is a rear view of a vehicle, and FIG. 6b is a view corresponding to FIG. 6a illustrating how the stabilizing device according to the invention can be used when a vehicle is parked on an uneven surface.

DETAILED DESCRIPTION

Figure 1:
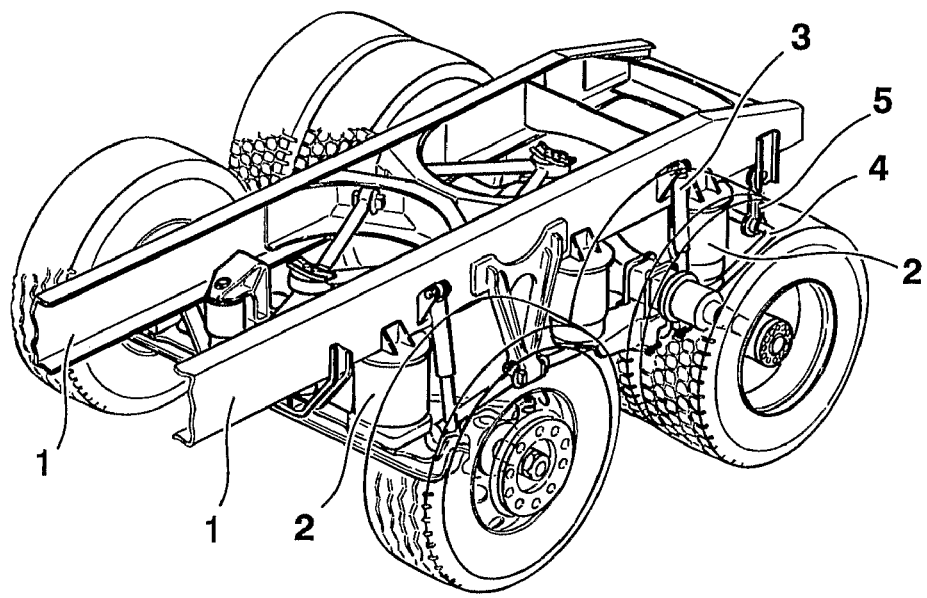
FIG. 1 is a perspective view of a rear wheel axle mounting in a truck.
Figure 2:
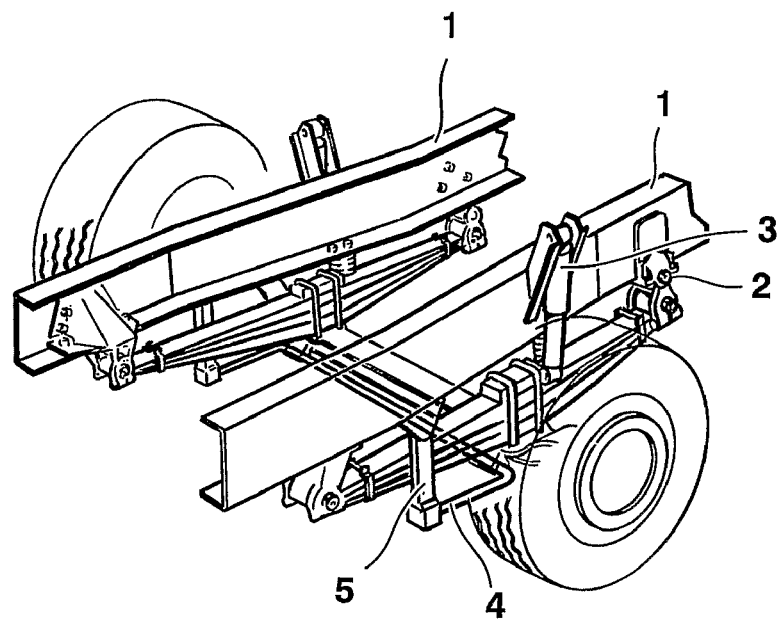
FIG. 2 is a perspective view of another wheel axle mounting in a truck.

With reference to FIGS. 1 and 2, a heavy vehicle is provided with suspended wheel axles. In these figures examples of such designs are shown. The vehicle chassis frame 1 includes two longitudinal beams extending in the driving direction. The wheels are mounted on an axle which is mounted to the frame 1 by a suspension means 2 and dampening means 3. Furthermore, there is provided an anti-roll bar or stabilizer bar 4 for stabilizing the vehicle and preventing the chassis 1 from rolling, e.g. when driving through corners. This stabilizer bar 4 has a portion 4b which extends substantially perpendicular relative to the longitudinal beams 1, i.e. substantially in parallel with the wheel axle. The stabilizer bar 4 is mounted to the axle, and at its distal ends the stabilizer bar 4 is pivotably mounted to a stabilizer arm 5 on each side of the vehicle, and these stabilizer arms 5 are anchored to the respective longitudinal beam of the chassis frame 1. Although the features described with reference to FIGS. 1 and 2 belong to prior art, some or all of these features can be used together with the invention. In the following same reference numerals will be used for same or corresponding components when the components specific to the invention are discussed.

Figure 3:
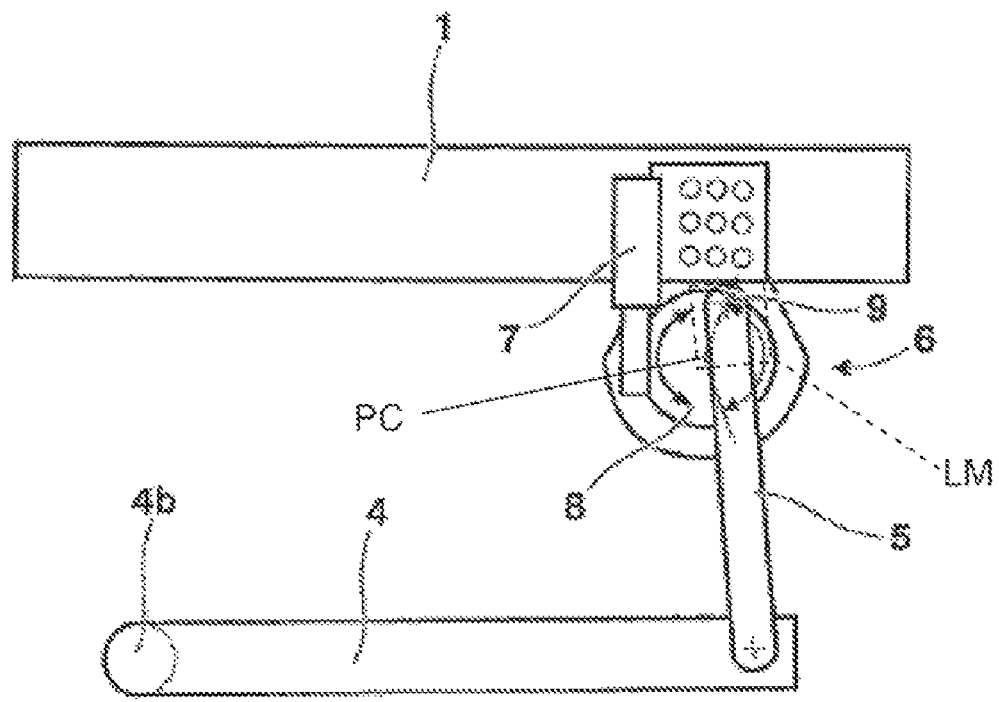
FIG. 3 is a schematic lateral view of an embodiment of a stabilizing device according to the invention.

In FIG. 3 a stabilizer device according to the invention is illustrated in a schematic lateral view. As shown in FIG. 3, a stabilizer bar 4 is pivotally mounted to the lower end of a stabilizer arm 5. The upper end of the stabilizer arm 5 is pivotally mounted to a stabilizer anchor means 6 which is arranged on a vehicle frame 1. The vehicle frame 1 can comprise a first longitudinal beam and a second longitudinal beam. A portion 4b of the stabilizer bar 4 extends, preferably substantially in parallel with the wheel axle, from one side to the other side of the frame, i.e. between two stabilizer arms. Each stabilizer arm 5 is preferably arranged on the frame via such a stabilizer anchor means 6.

The stabilizer anchor means 6 can comprise an actuator means 7 such as an electric or hydraulic motor capable of pivoting a pivot member 8, such as disc. Although the pivot member is illustrated as a disc 8, it should be stressed that other designs are also possible. For example, the pivot member could be a rod arranged as a lever arm. In addition to electric and hydraulic motors other possible actuator means are hydraulic or pneumatic cylinders. In the example illustrated in FIG. 3 a stabilizer arm attachment point 9 is provided on the pivot member 8 for attachment of the upper end of the stabilizer arm 5. The stabilizer arm attachment point 9 is situated off-set relative to the centre of the pivot member 8.

According to the invention the stabilizer arm attachment point 9 is displaceable so as to enable the effective length of the stabilizer arm 5 to be adjusted within a predetermined interval. In the embodiment illustrated in FIG. 3, the upper position of the stabilizer arm 5 can be moved up or down allowing for an improvement in the lifting strokes as the stabilizer arm 5 is effectively made longer (or shorter) when the disc 8 is pivoted by the motor 7. Although the stabilizer arm attachment point 9 is preferably displaceable mainly in the vertical direction, also a certain displacement in the horizontal direction can be allowed or desired.

Furthermore, instead of using said actuator means 7 the chassis lifting motion, which results in that the effective length of the stabilizer arm is changed, can be accomplished by means of for example air springs arranged on the vehicle. (See FIG. 2 where air springs 2 are arranged between the frame and the wheel axles.)

The stabilizer arm 5 may be a rod with a fixed length or may be a telescopic arm, such as hydraulic cylinder. The motor 7 may preferably include a worm gear for pivoting the pivot member 8 since such gearing may be provided with a high ratio and is self-locking. In any case, the stabilizer device preferably comprises a fixation or locking means for keeping the position of the stabilizer arm attachment point 9 in the desired position after adjustment of the effective length of the stabilizer arm 5. Such a locking mechanism may include a brake function for fixing the position of the pivot member 8.

For different applications, a chassis control system of the vehicle and/or the stabilizer anchor means can be adapted to either prevent or allow displacement of the stabilizer arm attachment point 9 during driving of a vehicle to which vehicle the stabilizing device is mounted.

Figure 4:
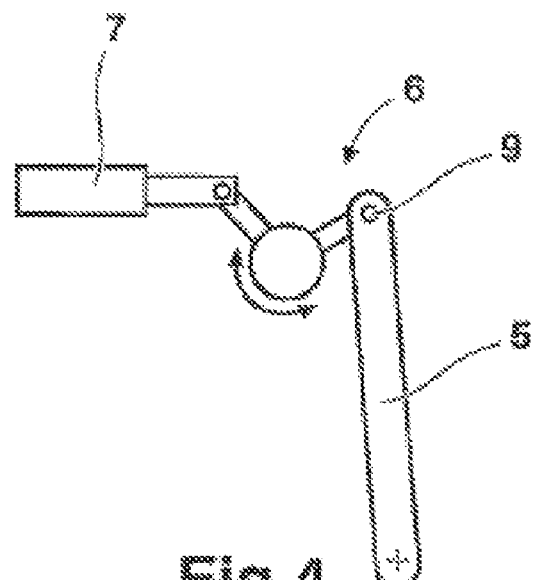
FIG. 4 is a variant of the stabilizing device in FIG. 3.
Figure 5:
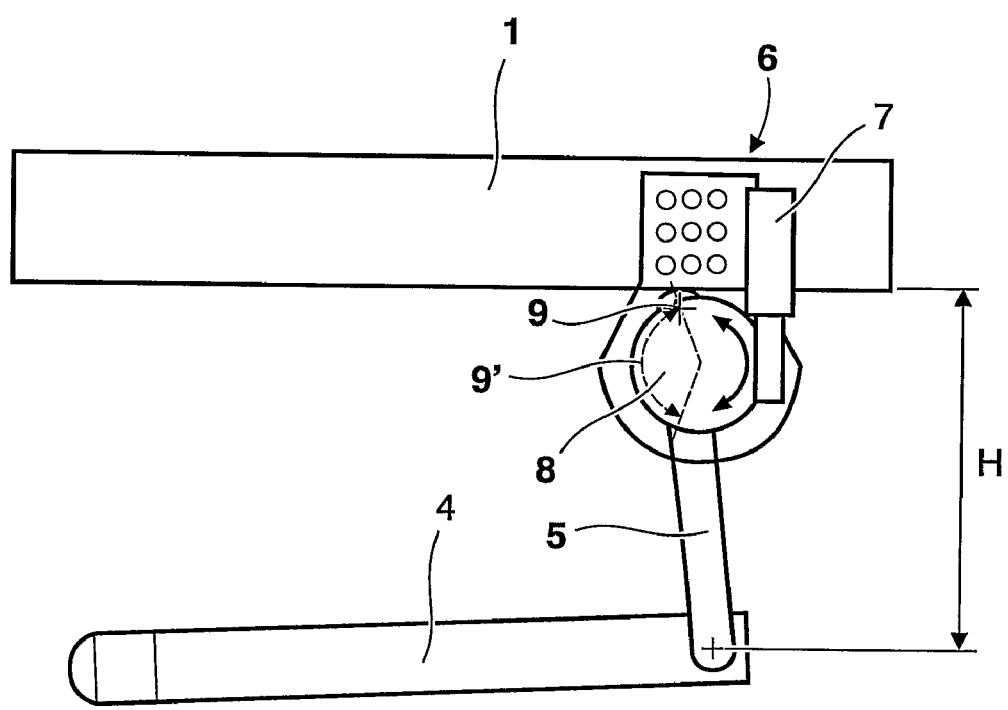
FIG. 5 is a further variant of the stabilizing device in FIG. 3.

The effective lengthening of the stabilizer arm 5 can be provided by mounting the arm 5 onto a pivotally arranged disc 8 of the stabilizer anchor means 6, as shown in FIGS. 3 and 5. However, as shown in FIG. 4, other embodiments of the stabilizer anchor means and actuator mechanisms may be provided without departing from the invention. The main thing is to enable the effective length of the stabilizer arm 5 to be changed or adjusted within a predetermined interval by providing a stabilizer arm attachment point 9 which is displaceable. In the embodiment illustrated in FIG. 4 a pivot arm system is used instead of the previously described disc. Although the stabilizer arm attachment point is displaced by a pivot or rotation motion in the illustrated embodiments of the invention, it would be possible to design the stabilizer anchor means so as to make the stabilizer arm attachment point displaceable through a linear movement thereof. The stabilizer arm attachment point is then displaceable preferably in a substantially vertical direction.

By the invention an active stabilizer function is provided to create a force and a level chassis adjustment. The torque needed to pivot the disk 8 and thereby "lengthen" the stabilizer arm 5 depends on the size of the vehicle, but it is found that a torque in the interval of 5-100 kNm is needed for most applications. The stabilizer device can by the motor 7 actively apply a force on the stabilizer bar 4 to counteract the vehicle roll and keep the chassis level. The device can also reduce the stiffness of the suspension when needed, which may be advantageous in relation to off-road trucks, if the axle roll is measured on both sides.

Together with a steering wheel angle sensor, the vehicle chassis control system of a vehicle can also anticipate a curve and apply a force before the vehicle has started to roll. This would reduce the needed forces from the system and increasing the response time. In such an active system, a sensor means (not shown) is preferably included in the stabilizer device for determination of the position of the stabilizer arm attachment point 9, for instance by monitoring the angular position of the disc 8.

As shown in FIG. 5 (in comparison to FIG. 3), the actuator means 7 may be provided on either side of the stabilizer anchor means 6.

As further appears from FIG. 5, the pivot member 8 may be angularly displaced between an upper and a lower position for the stabilizer arm attachment point 9. The angular displacement is indicated in FIG. 5 by the arrow denoted 9'. Hereby the height H, i.e. the distance between the frame 1 and the stabilizer bar 4 may be altered.

The stabilizer device preferably comprises a control means (not illustrated) for controlling the stabilizer anchor means 6, i.e. the actuator means 7 of the stabilizer anchor means 6. Said control means can cooperate with or be constituted by an already existing chassis control system of the vehicle. The stabilizer anchoring means 6 on each side of the vehicle may preferably be operated and controlled independently, which allows for an adjustment of the relative position between the axle 11 and the vehicle chassis 10, as illustrated in FIGS. 6a and 6b. This means the vehicle chassis 10 may be kept or moved into horizontal after parking so that loading and unloading of goods from the truck can be carried out easily and safely even when the truck is parked on an uneven surface, for instance in cities with a side set of wheels on the side walk.

It is to be understood that the present invention is not limited to the embodiments described above and illustrated in the drawings; rather, the skilled person will recognize that many changes and modifications may be made within the scope of the appended claims.

The invention claimed is:

1. A stabilizing device for a heavy vehicle, comprising a stabilizer bar which can be attached to a vehicle axle and pivotally mounted relative to a vehicle frame via stabilizer arms, the stabilizer bar and respective stabilizer arm being pivotally interconnected to each other, wherein at least one stabilizer arm is pivotally attached to a stabilizer anchor at a stabilizer arm attachment point, the stabilizer anchor being mountable in a vehicle frame, the stabilizer arm attachment point being displaceable so as to enable the effective length of the stabilizer arm to be adjusted within a predetermined interval.

2. A stabilizing device according to claim 1, wherein the stabilizer arm attachment point is displaceable in a vertical direction when the stabilizing device is mounted to a vehicle.

3. A stabilizing device according to claim 1, wherein the stabilizer anchor comprises an actuator for displacement of the stabilizer arm attachment point.

4. A stabilizing device according to claim 3, wherein the actuator comprises an electric or hydraulic motor, or a hydraulic or pneumatic cylinder.

5. A stabilizing device according to claim 4, wherein the stabilizing device comprises a control for controlling the stabilizer anchor so as to control the chassis lifting motion and/or roll characteristics of a vehicle.

6. A stabilizing device according to claim 5, wherein the control and/or the stabilizer anchor are adapted to allow displacement of the stabilizer arm attachment point during driving of a vehicle to which the stabilizing device is mounted.

7. A stabilizing device according to claim 5, wherein the control and/or the stabilizer anchor are adapted to prevent displacement of the stabilizer arm attachment point during driving of a vehicle to which the stabilizing device is mounted.

8. A stabilizing device according to claim 5, wherein the control cooperates with or is constituted by a vehicle chassis control system of the vehicle.

9. A stabilizing device according to claim 1, wherein the at least one stabilizer arm has a telescopic function.

10. A stabilizing device according to claim 1, wherein the at least one stabilizer arm is a hydraulic cylinder.

11. A stabilizing device according to claim 1, wherein the stabilizer anchor comprises a locking mechanism for fixing the position of the stabilizer arm attachment point and thus prevent further displacement thereof.

12. A vehicle comprising a stabilizing device according to claim 1.

13. A stabilizing device according to claim 1, wherein the stabilizing anchor is pivotably attached to the stabilizing arm at a pivot axis remote from a pivot axis of the stabilizing arm and the stabilizing bar.

14. A stabilizing device according to claim 1, wherein the stabilizing arm is mounted relative to the vehicle frame through the stabilizer anchor.

15. A stabilizing device according to claim 1, wherein the stabilizer bar is directly attached to the vehicle axle.

16. A stabilizing device for a heavy vehicle, comprising a stabilizer bar which can be attached to a vehicle axle and pivotally mounted relative to a vehicle frame via stabilizer arms the stabilizer bar and respective stabilizer arm being pivotally interconnected to each other, wherein at least one stabilizer arm is pivotally attached to a stabilizer anchor at a stabilizer arm attachment point, the stabilizer anchor being mountable in a vehicle frame, the stabilizer arm attachment point being displaceable so as to enable the effective length of the stabilizer arm to be adjusted within a predetermined interval, wherein the stabilizer anchor comprises a pivot member providing the stabilizer arm attachment point.

17. A stabilizing device according to claim 16, wherein the pivot member is a disc.

18. A stabilizing device according to claim 16, wherein the stabilizer attachment point is positioned off-set from a pivot centre of the pivot member.

19. A stabilizing device for a heavy vehicle, comprising a stabilizer bar which can be attached to a vehicle axle and pivotally mounted relative to a vehicle frame via stabilizer arms, the stabilizer bar and respective stabilizer arm being pivotally interconnected to each other, wherein at least one stabilizer arm is pivotally attached to a stabilizer anchor at a stabilizer arm attachment point, the stabilizer anchor being mountable in a vehicle frame the stabilizer arm attachment point being displaceable so as to enable the effective length of the stabilizer arm to be adjusted within a predetermined interval, wherein the stabilizing device comprises a sensor for determination of the position of the stabilizer arm attachment point.

\* \* \* \* \*